(12) United States Patent
Kochis et al.

(10) Patent No.: US 6,259,084 B1
(45) Date of Patent: Jul. 10, 2001

(54) SYSTEM AND METHOD FOR IMPROVED SCANNING ACCURACY THROUGH NOISE REDUCTION AND PULSE TIMING

(75) Inventors: Richard L Kochis, Ft Collins; Dan L Dalton; Robert W Moss, both of Greeley; Brian L Hastings, Fort Collins; Thomas C Oliver, Windsor, all of CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/389,206

(22) Filed: Sep. 2, 1999

(51) Int. Cl.[7] ................................................ H04N 3/14
(52) U.S. Cl. ........................... 250/208.1; 348/294
(58) Field of Search ..................... 250/208.1; 348/241, 348/243, 294, 304, 308, 311

(56) References Cited

U.S. PATENT DOCUMENTS

| 5,654,537 | * | 8/1997 | Prater | 250/208.1 |
| 6,054,704 | * | 4/2000 | Pritchard et al. | 348/302 |
| 6,130,713 | * | 10/2000 | Merrill | 348/308 |
| 6,147,340 | * | 11/2000 | Levy | 250/208.1 |
| 6,188,057 | * | 2/2001 | Misek | 348/294 |

* cited by examiner

Primary Examiner—Stephone B. Allen

(57) ABSTRACT

The invention relates in general to providing greater accuracy in scanning and digital reproduction of images. More specifically, the invention acts to improve the precision of optical data by substantially eliminating sensor drift or "dark current" and acts to improve the accuracy in identification of the position at which various optical samples are taken by determining and correcting for the lag time inherent in initiating and executing a sampling operation.

20 Claims, 3 Drawing Sheets

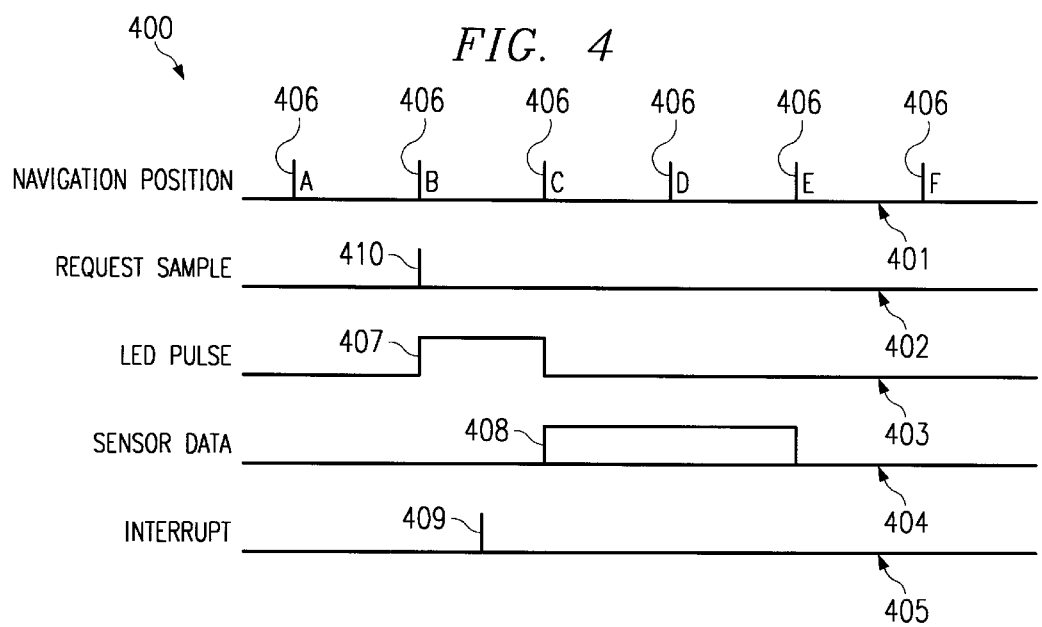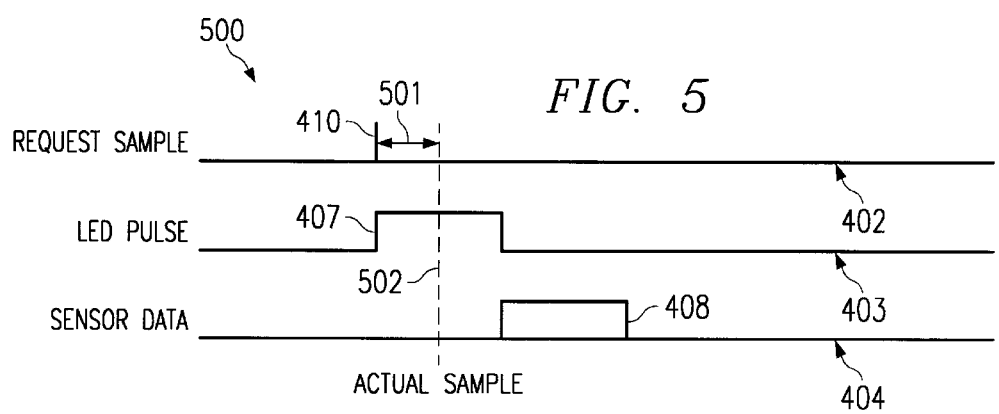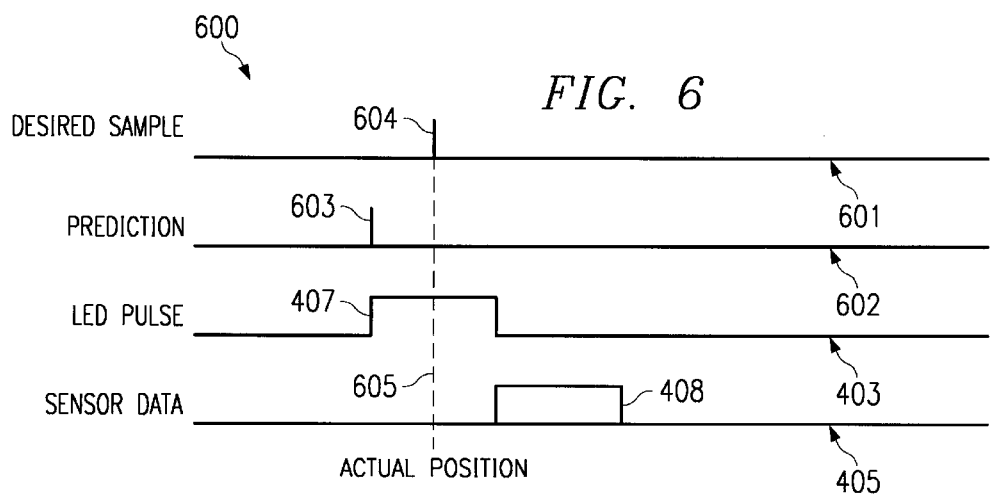

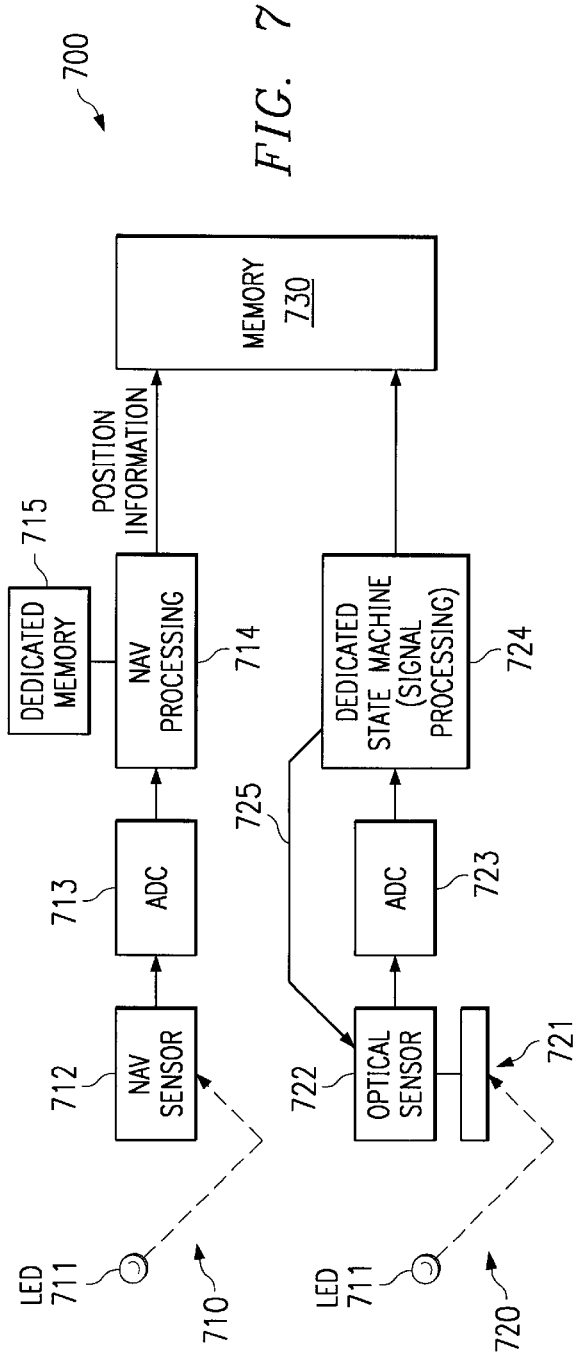
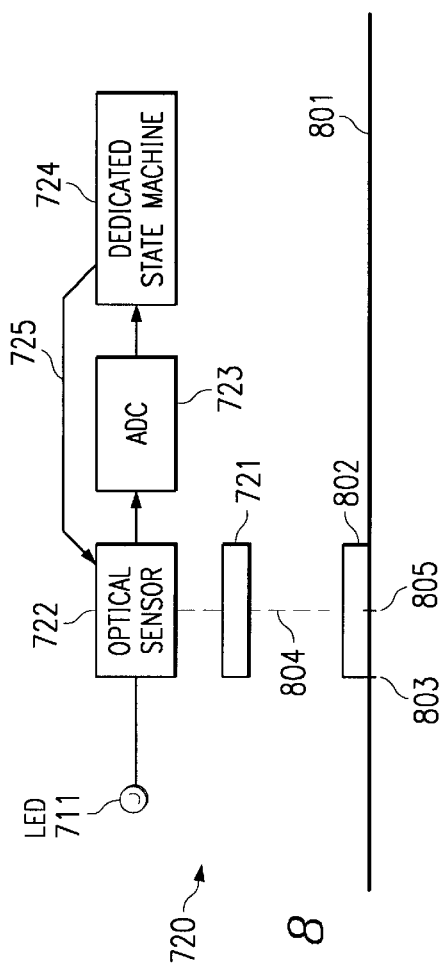

SYSTEM AND METHOD FOR IMPROVED SCANNING ACCURACY THROUGH NOISE REDUCTION AND PULSE TIMING

TECHNICAL FIELD

The invention relates generally to digital imaging and in particular to a system and method for improving the imaging process by more accurately acquiring the image data itself as well as the position data associated with such image data.

BACKGROUND

Copiers, facsimile machines and image scanners convert visual images into an electronic form suitable for printing, storage, transmission, or other computer and electronic uses. A system typically includes a light source, an array of photosensors, and electronics for converting analog photosensor outputs into digital data. Light is reflected off of an opaque image medium or light is transmitted through a transparent image medium and focused onto the photosensors. Color devices may have multiple light sources, each with a different band of wavelengths, or broad spectrum light may be split into multiple bands by a color separator, or through the use of filters.

A photosensor array segment includes a linear array of photodetector elements (referred to herein simply as photodetectors) and the electronics to support the photodetectors. The individual photodetectors are spaced a constant distance from each other in the linear array and are typically mounted to, or are part of a printed circuit board or substrate. Each individual photodetector generates a data signal corresponding to the intensity of light the photodetector receives. The data signals generated by the photodetectors are typically voltages. Each data signal generated by each photodetector represents one bit of the data generated by the multi-segment linear photosensor assembly, which, in turn, is one bit of the data representing the scan line portion of the object being imaged. The bits of data generated by the multi-segment linear photosensor assembly are commonly referred to as "picture elements" or "pixels." The term "pixel" is also sometimes used in the art to refer to individual photodetector elements or to the portions of an object that are imaged on these individual photodetector elements.

Sampling is a process by which the light emerging from an image being scanned is converted into an energy form, typically a voltage, as measured by a sensor, which is then digitized, read, and processed by a digital computer. Typically, the voltage or energy level of the measuring instrument will be substantially proportional to the light intensity emerging from an image.

Ideally, sensors placed over a completely dark image would therefore indicate an absence of energy, thereby ensuring that a subsequent light measurement would be highly accurate. In reality however, a phenomenon known as "dark current" exists. This "dark current" refers to a gradual accumulation of charge, or "sensor drift" by sensors positioned over a dark surface. When scanning real world surfaces, such dark current represents a source of error, or noise, to the overall scanning apparatus and tends to represent images as being lighter than they really are.

When sampling synchronously, sampling operations occur continuously. Accordingly, a disadvantage of the synchronous sampling approach is that many samples will be taken where no valuable image information is present, leading to a considerable waste of energy. In a battery powered hand-held device, such wasted energy may cause substantial inconvenience by causing the batteries to be rapidly drained.

The accuracy of a scanning operation demands accurate readings of light emission from a surface being scanned, as noted above. Accurate reconstruction of the image with digital data however, also requires that optical data acquired from the image be associated with positional data which accurately reflects the position at which such image data was collected. Various characteristics of optical sensors used in scanning operations may contribute to error in association of position data with image data.

Taking a sample of an image at a particular point may comprise turning on or pulsing a light source, such as a light emitting diode (LED), for a specific period of time and instructing appropriate signal processing equipment to convert a sensor value into digital data at the point on the image for which the sample is desired. A problem arises from the fact that a finite delay exists between issuing the command to turn on the light source and a point in time which represents the chronological center of the light pulse.

This delay causes the scanning system to process an image which is a finite distance away from the point at which sampling was sought and to incorrectly identify the location associated with the collected image data. There is a need in the art for a mechanism to correct any positional error due to the delay between the request and execution of an image sampling operation.

When the scanning instrument travels at a constant speed over the image being sampled, the sampling position error should at least be relatively constant among a number of measurements taken, making the overall sampling results susceptible to corrective action which is equally applicable to all measurements. A more difficult situation arises however, in the case where a scanning instrument travels at variable velocities throughout a scanning operation. The position error associated with each sample will be different and thus more difficult to correct.

Therefore, there is a need in the art for a sampling method which samples only where worthwhile information is located.

There is a further need in the art for a sampling method which does not waste energy by sampling where no valuable information is located.

There is a still further need in the art for a system and method for correcting the position error associated with sampling data arising from a delay between request for and execution of a sampling operation.

SUMMARY OF THE INVENTION

These and other objects, features and technical advantages are achieved by a system and method which samples asynchronously upon command of a controller and resets the values of individual sensors before sampling operations to remove biasing of the measurements caused by dark current.

Asynchronous sampling enables the scanning mechanism to conserve energy by sampling an image only where there is useful information. The mechanism can thereby save energy associated with what would have been wasted sampling operations in the case of synchronous sampling. Battery life in a handheld scanner can thereby be extended by using asynchronous sampling.

In the case of synchronous sampling, sampling is essentially continuous. Since the act of sampling itself acts to discharge the sensor (in the case of CCD, CIS, or other visible light sensors), there tends to be little buildup of dark current in synchronous sampling operations. Further, any charge or dark current buildup which does arise is likely to be at similar levels across a number of different sampling operations since the samples are taken after substantially identical time intervals since a previous sampling operation.

By contrast, when employing asynchronous sampling, the problem of dark current or sensor drift may become a serious issue. First, the lack of synchronous operation prevents the regular discharge of sensor energy which normally occurs through the synchronous sampling process thereby permitting the accumulation of dark current to reach levels which would cause substantial measurement error if left intact. Second, due to the asynchronous nature of the sampling operation, the time intervals between sampling operations will vary unlike the case with synchronous sampling. The accumulation of dark current, aside from being significant, may also vary considerably between different sampling operations leading to substantial distortions in the information being gathered from the image being scanned. Those samples taken after long inactive intervals will generally have more sensor drift, and those samples taken after brief inactive intervals will likely have less sensor drift. Therefore, there is a need in the art for a mechanism which would eliminate any difference in dark current, or drift, between samples forming an image which were acquired asynchronously. There is a further need for a mechanism to reduce as far as possible the total amount of dark current present in the sensors of a scanning apparatus.

In order to prevent dark current, or noise, on the individual sensors from causing error in the sensor readings, each sensor is held in a reset state until it is instructed to perform a sampling operation. This reset state holds the sensor at a "zero" value, or other constant value in between sampling operations. The reset sensor value will preferably be the same among all sensors used in the scanning apparatus. Holding each sensor value constant in between sampling operations prevents the buildup of electrical charge, or other form of energy storage, which leads to inaccuracy in the sampling values. The reset function may be applied continuously in between sampling operations thereby continuously holding each sensor to a zero or other constant value or may be pulsed immediately prior to a sampling operation.

When sampling asynchronously, not only does the problem of sensor drift exist, but such sensor drift would likely be higher for samples taken after longer idle periods (nonsampling time) than after shorter idle periods. Deployment of the reset function not only substantially eliminates sensor drift in general, it also substantially eliminates the variation in such sensor drift between sampling operations taken after differing periods of idle time. Therefore, asynchronous sampling benefits even more than synchronous sampling from the reset function of the present invention.

In the prior art, the practice of continuous sampling and its attendant result of continuous discharging of the sensors rendered the deployment of a reset function unnecessary. Therefore, the solution of asynchronous sampling (directed to saving electrical energy) produced a new problem for which a new solution is desirable.

As discussed above, proper scanning of an image requires, as accurately as possible, that sensor values representing the optical characteristics of an image be faithfully represented. Further, proper scanning requires that the position on the image being represented be known with precision so that the image may be accurately reconstructed later. Sensor drift pertains to the accuracy of the optical information itself A second source of error in representation of the image may arise if the position at which a sample is taken is unintentionally misrepresented, even if the actual sensor value is valid.

In a preferred embodiment of the present invention, movement of one or more sensors over an image to be scanned may occur at varying velocity making asynchronous sampling desirable. Asynchronous sampling tends to aggravate the above described sources of error in sensor values and in perceived sensor position which are addressed by the present invention.

With respect to a second cause of error in scanned image reproduction, causes of error in the perceived position of a portion of an image being scanned include the delay time between a command for a sensor to perform a sampling operation and the actual execution of the sampling operation.

In a preferred embodiment of the present invention, a Contact Image sensor (CIS) is employed to sample the image upon command. Alternative sensors for use in the present invention include but are not limited to charge coupled devices (CCDs) or other visible light sensors. Preferably, an LED or white light source is employed to illuminate the object being scanned for a predetermined period of time. Preferably, the geometric center of the range of the image which is illuminated by the LED during the sampling operation is recorded as the positional data point for the optical image data acquired in that sampling operation. However, the existence of a delay period between a request for a sampling operation and its execution causes the perceived position data point and the actual geometric center to differ by a product of the delay period and the relative velocity of the sensor with respect to the image being scanned.

The LED or other light source is preferably mounted on a movable scanning apparatus and fixed with respect to the optical sensor. Alternatively, the light source may be detached from the scanning apparatus and fixed with respect to the object being scanned. Further, a plurality of light sources may optionally be employed.

In a preferred embodiment, one or more counters associated with the LED or other light source operate throughout the period of illumination of the LED, and optionally throughout an entire scanning operation. Information from the counters can be used to identify the duration of the LED pulse. This information is then fed to a navigation processor or other computing device which uses the counter information to calculate the geometric center of the LED pulse. Timing information from the counters is generally sufficient to enable a computing device to appropriately modify the initial positional data when the following information is known: a time delay between issuance of a command to begin sampling and the beginning of the light pulse (Ts), the duration of the light pulse (Tp), and the scanning velocity (Vs). The total time delay between the point at which the command to begin sampling is issued and the chronological center of the light pulse is T(delay)=Ts+Tp/2. The difference in sensor position due to this time delay would require that the previous result be multiplied by the navigation velocity (Vnav). The positional correction would therefore be POSITION ERROR=T (delay)*Vnav.

Determining absolute position of a center of a sampling operation would generally require combining initial geometric information with the position error information. The initial geometric information may be provided by the navigation equipment or by counters which keep track of time elapsed from the beginning of the entire scanning operation.

In an alternative embodiment, knowledge by the computing equipment of the relative velocity between the sensors and the image being scanned can be employed to more accurately calculate an offset to the perceived measurement position in order to arrive at an actual measurement position on the image. The velocity is calculated by the computing equipment using information about the distance between samples, and the rate at which such sampling occurs, the distance and sampling rate information being known to the computing equipment at the outset. In this embodiment, the computing equipment initiates a sampling operation by turning on the LED, thereby initiating a counter. Upon acquiring information regarding the start and stop times of the LED, and the velocity of the sensor with respect to the image, the computing equipment calculates the geometric center of the LED illumination along the scanning path. The calculation of the geometric center will be more accurate when velocity is actively taken into account since minor variations in velocity will introduce error into a simple linear interpolation calculation which assumes a constant velocity.

In another alternative embodiment, knowing velocity information and the delay time associated with operating the LED sensors, the computing equipment can predict a point in time at which the next sample should be requested so that the geometric center of LED operation will be as close as possible to the targeted point on the image for the next sample. With such a predictive scheme properly implemented, subsequent correction of the position data associated with a sampling operation would preferably be unnecessary. However, still further precision could be employed by combining the benefits of predictive sampling and subsequent interrupt based correction of the positional data.

In this combined mode of operation, predictive sampling would be employed to generate a "best guess" as to the point at which a sampling operation should be initiated. Subsequently, information about the actual geometric center of LED illumination as determined by timers associated with the LED, or other light source, would provide information which could correct, if necessary, the positional data associated with the pertinent optical sampling operation.

In a preferred embodiment, means for determining of the position of the sensors with respect to the image being scanned include but are not limited to: encoders, which may or may not be optical, interrupters, which may or may not be optical, and an optical paper fiber navigation module. One version of such a navigation module is the subject of commonly assigned issued U.S. Pat. No. 5,825,044 entitled "FREEHAND IMAGE SCANNING DEVICE WHICH COMPENSATES FOR NON-LINEAR COLOR MOVEMENT" and is used in the Hewlett Packard CapShare 910 Information Appliance™ product.

The optical paper fiber navigation module preferably employs an area sensor to take a sequence of photographs of the paper fiber. The series of photographs are then correlated with each other in order to calculate position and velocity.

Generally, the sensors described above acquire position information periodically, not continuously. Encoders generally generate information whenever the sensor position changes by some predefined amount. The paper fiber navigation module generally provides information each time a new photograph or picture frame is acquired.

The periodic nature of position information acquisition described above is preferably compensated for by the features of the present invention. By employing counters which identify gaps in time between the issuance of a sampling command, the geometric center of illumination of the image being scanned, and the points at which sensor position is measured, the system is able to acquire precise position information regarding the location at which sampling information is acquired and to thereby overcome the periodic nature of the various position information acquisition means.

Therefore, it is an advantage of the present invention that energy can be saved, and battery life prolonged by asynchronously sampling an image only where useful information will be found.

It is a further advantage of the present invention that the reset function can substantially eliminate noise or sensor drift in an optical sensor prior to an optical sampling operation.

It is a further advantage of the present invention that use of said reset function can be used to particular advantage over the prior art when optical sampling operations are performed asynchronously.

It is a still further advantage of the present invention that the geometric center of a sampling operation can be identified enabling accurate positional data to be associated with optical data from a sampling operation.

It is a still further advantage of the present invention that predictive sampling may be employed wherein knowledge of a lag time between request and execution of a sampling operation permits a sampling operation to be requested so as to ensure that the desired geometric sampling point and the actual geometric sampling point coincide.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 4 depicts a sequence of steps in a scanning operation employing linear interpolation to precisely determine the geometric center of an output pulse according to a preferred embodiment of the present invention;

FIG. 5 depicts a sequence of steps in which error due to a finite time lag is compensated for employing only position interpolation according to a preferred embodiment of the present invention;

FIG. 6 depicts a sequence of steps wherein predictive sampling is employed to enable sampling to occur at a desired position according to a preferred embodiment of the present invention;

FIG. 7 depicts a preferred embodiment navigation system apparatus suitable for carrying out the operations of the present invention; and FIG. 8 depicts a preferred embodiment navigation system apparatus placed over a surface to be scanned.

DETAILED DESCRIPTION

Figure 1:
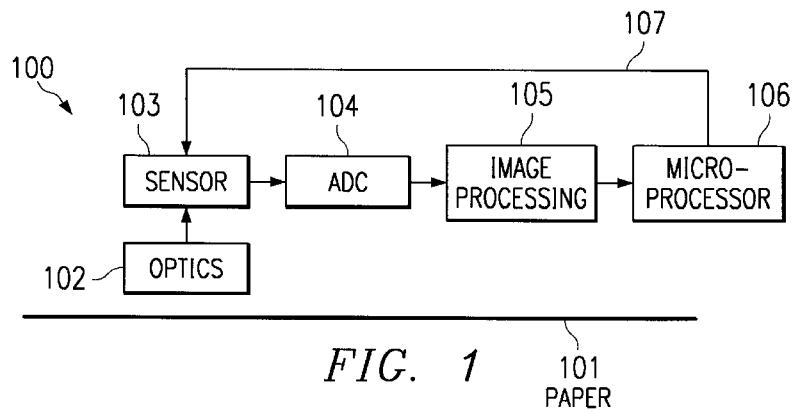
FIG. 1 depicts equipment suitable for performing scanning operations and processing data from said scanning operation according to a preferred embodiment of the present invention.

FIG. 1 depicts equipment suitable for performing scanning operations and processing data from the scanning operations according to a preferred embodiment of the present invention. Scanning apparatus 100 comprises optical equipment, such as a lens 102, which receives light from paper or other image substance 101 and transmits optical information to sensor 103. The sensor 103 converts optical energy into a form suitable for digitization such as voltage. The Analog to Digital converter 104 converts the sensor data into digital form and transmits the digitized data to an image processor 105. When image processing is complete, the processed data is transmitted in turn to microprocessor 106. Alternatively, a host computer could be employed.

In a preferred embodiment, the sensor 103 is preferably held in a reset state prior to initiating a sampling operation via use of a reset command 107 delivered to the sensor, preferably from a microprocessor. Preferably, the sensor energy level is thereby kept at a zero level until a request to start a sampling operation is received by the sensor. Alternatively, the sensor energy level could be kept at constant non-zero level. Alternatively, the reset operation may be in the form of a reset pulse which is issued to the sensor 103 immediately prior to the start of a sampling operation. In a preferred embodiment, the sensor 103 is a visible light sensor such as a CCD or CIS sensor.

In a preferred embodiment, the reset command, whether in the form of a reset pulse or continuous reset, is issued by a computer controller. Alternatively, the reset command could be issued by any intelligent device which is able to coordinate issuance of the reset command with the image scanning operation.

Figure 2:
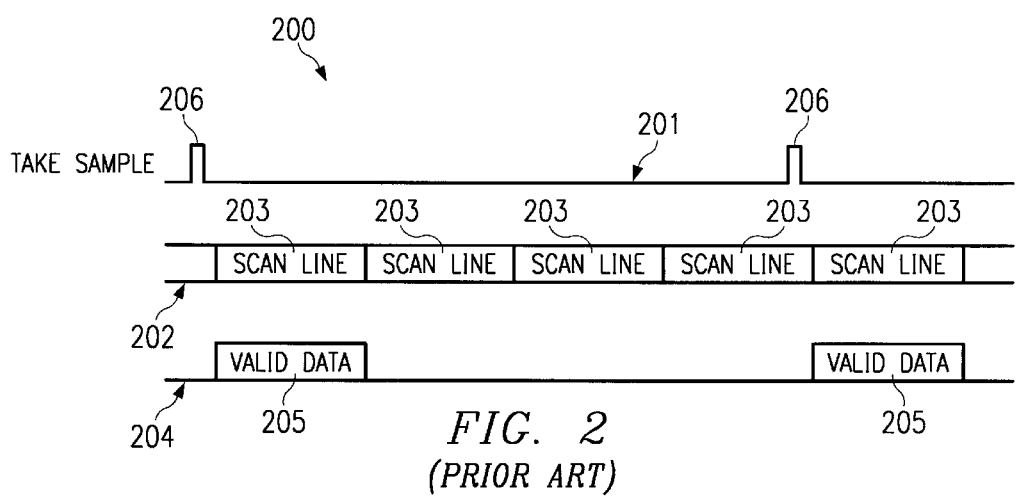
FIG. 2 depicts a sequence of steps in a scanning operation according to a synchronous sampling scheme.

FIG. 2 depicts the time lines of various activities associated with a traditional synchronous sampling operation. The three lines represented are: the sample command time line 201, the scanning operation time line 202, and the data collection time line 204. It can be seen that the scanning operation time line 202 operates synchronously with or without there having been a request to acquire sampling data.

Two requests for sampling data 206 are shown on time line 201 which are followed closely in time by scan lines or sampling operations 203, on time line 202, which coincide with periods of collection of valid data 205, on time line 204. It can be seen that the scanning operation as depicted by the "scan lines" 203 on time line 202 continues regardless of the issuance of sampling requests 206 in accordance with the characteristics of synchronous operation. Such synchronous scanning uses energy but does not yield useful data. The controller or microprocessor can later drop unwanted scan lines (i.e. scan lines which contain no useful data).

Figure 3:
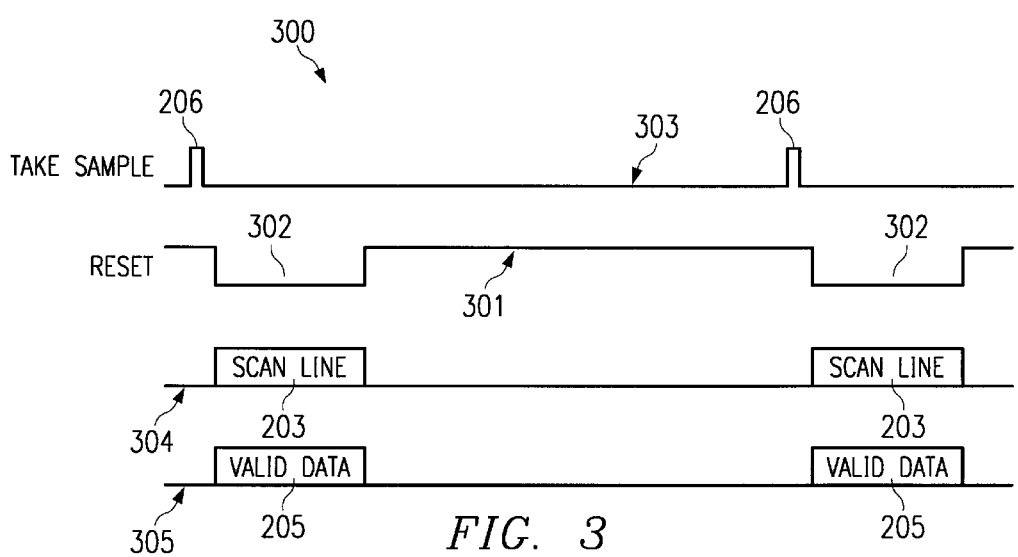
FIG. 3 depicts a sequence of steps in a scanning operation employing asynchronous sampling and a reset function according to a preferred embodiment of the present invention.

FIG. 3 depicts a sequence of steps 300 in a scanning operation employing asynchronous sampling and a reset function according to a preferred embodiment of the present invention. Four time lines are present in FIG. 3, which represent, respectively, sample request time line 303, reset command time line 301, scanning operation time line 304, and data collection time line 305.

In a preferred embodiment, the scanning mechanism conducts scanning operations and collects data only when commanded to do so by a request for sampling data 206. Energy can thereby be saved, by scanning only when data generated by such sampling is desired and destined for use in the digital reproduction of the image being scanned. Time line 301 introduces the feature of the reset command 302. Random energy accumulation in the sensors, which may be known as "dark current" or "sensor drift" is removed by the reset function which depletes this accumulated sensor energy. When the sampling operation 203 is not active, the reset function is activated and thereby prevents any buildup of energy in the sensors. Preferably, immediately after a request for data 206 is issued, the reset function is deactivated to enable the sensors to begin accumulating energy in accordance with light emitted from the image being scanned.

In a preferred embodiment, the reset function is implemented by bringing the electrical output of the sensor to ground. This may be accomplished by several mechanisms including but not limited to: a reset switch which connects the sensor output to electrical ground or other constant voltage level and conducting a "dummy" read operation which discharges the sensor but does not produce data which the microprocessor will preserve.

Additionally or alternatively, sensor noise may be reduced by manipulating optical data reaching the sensor so as to minimize reception of extraneous light by the sensor. Mechanisms for accomplishing this include but are not limited to blocking all access to light by the sensing element. The described "light blocking" step generally addresses a source of possible sensor error which is independent of dark current or sensor drift.

In an alternative embodiment of the present invention, the sensors would be permitted to accumulate energy or "noise" when not actively sampling, and the reset function 302 would be pulsed for only a brief period immediately preceding initiation of the scanning operation 203, thereby depleting any energy buildup in the sensors prior to said scanning operation 203. The reset function may be implemented by a number of mechanisms including but not limited to shorting a voltage based sensor to ground, or other constant voltage level, or by conducting "dummy" read operations to deplete sensor energy.

Preferably, deployment of the reset function should improve accuracy in the sensor readings while using any form of sampling scheme. However, since sensor drift generally increases with time, asynchronous sampling operations experience even more improvement, since sensor drift would likely have been inconsistent among various readings taken depending upon how long the sensor had been idle prior to a particular scanning operation. The reset function is therefore particularly beneficial for asynchronous sampling operations.

In a preferred embodiment, a request for data 206 is issued following which the reset function is set low 302 to enable the sensors to begin accumulating energy. The scanning operation 203 then proceeds for a preset period of time during which valid image data 205 is collected by the sensors.

Scanning and reproducing an image requires accurate representation of the position at which certain image data was gathered as well as accurate optical data. A phenomenon which introduces error into the perceived position at which image data is acquired is the delay time between the request for, and execution of, the sampling of an image. The sequence of operations which follows addresses this problem through the use of counters and the use of an interrupt pulse to determine the actual position along an object at which image data was acquired.

FIG. 4 depicts a sequence of steps in a scanning operation employing linear interpolation to precisely determine the geometric center of an output pulse according to a preferred embodiment of the present invention. Five time lines are depicted in FIG. 4, representing respectively, navigation position time line 401, the request sample time line 402, the LED pulse time line 403, the sensor data time line 404, and the interrupt time line 405.

It is noted that the pulse 407 may be an electromagnetic energy pulse of a variety of types of which LED light is only one available option, and all such types are intended to be within the scope of the present invention. Transmitters for initiating a pulse may employ electromagnetic wave embodiments including but not limited to: visible light, infrared, ultraviolet light, radar, and microwave transmission. Sensors which may be used to collect the sensor data 408 include, but are not limited to: charge coupled device (CCD) sensors, contact image sensors (CIS) and other visible light sensors, infrared light sensors, ultraviolet light sensors, radar, and microwave sensors.

Time line 401 depicts a series of discrete known positions along the scanning trajectory labeled A, B, C, D, E, and F. These positions are preferably known in advance to the computing equipment which controls the scanning and data handling operations, or alternatively, may be calculated in real time. The computing equipment may be a specialized navigational processor, or other suitable processing device. The object of the sequence of operations depicted in FIG. 4 is to generate an interrupt at a point in the travel of the scanning equipment which best represents when the image data was acquired. Once this position data is acquired through the interrupt, it is associated with the measured image data and appropriately stored in computer memory. Although the interrupt is generated at the positional center of the LED pulse, this effectively also practically represents the positional center of the input data as well since any delay due to the finite speed of light is negligible. Accordingly, in the rest of this discussion, the center of the output pulse is considered synonymous with the effective center of the location from which the input data was received.

On time line 402, a request sample instruction 410 is generated which energizes an LED (or other visible light) pulse 407 which remains active for a predetermined period of time, displayed along time line 403. Light from the LED or other light source is reflected off the object being scanned and captured by the sensor. After the sensor has received the reflected energy, sensor or pixel data 408 is generated representing optical information about the portion of the object which was just scanned.

In an alternative embodiment, a plurality of LEDs may be used and energized in unison. In still another alternative embodiment, reflection of ambient light off the surface to be scanned may be used to acquire optical sampling data and the deployment of LEDs or other scanner-specific light sources may be omitted.

In a preferred embodiment of the present invention, a single counter is employed to indicate the chronological and geometric center of a pulse. Preferably, the counter starts counting at the beginning of the scanning operation and runs continuously until the conclusion of the sampling operation. In order to determine the chronological center of any pulse, the state machine 724 samples the counter values at the beginning and the end of that pulse and calculates the mean of the two values. The calculated mean, calculated as described, preferably represents the precise chronological center of the pulse and will then preferably be used to represent the time value to be associated with the optical sampling data gathered during the pulse concerned. For example, for the fourth pulse in a scanning operation, $C_i 4$ represents the counter value at the beginning of the pulse, and $C_f 4$ represents the counter value at the end of the pulse, the time value to be associated with sampling data for the fourth pulse, T4, in the scanning operation is represented by: $T4=(C_i 4+C_f 4)/2$. In this case, $T_4$ will represent the point in time of the center of the fourth pulse with respect to the beginning of the scanning operation.

In an alternative embodiment, information from a counter may be combined with known positions of the navigation positions to establish an absolute location for the pulse and associated sampling operation. Preferably, a single counter is turned on at the beginning of a pulse and turned off at the conclusion of the pulse thereby effectively measuring the duration of the pulse. This pulse duration measurement may then be halved to determine a lapse of time between the beginning of the pulse and the calculated center of the pulse. This lapse of time may be then be used to determine a displacement between the beginning and the center of the pulse. The location for the center of the pulse in the context of the entire scanning operation can then be determined by adding the previously calculated displacement to a known position of the most recent navigation marker or navigation position.

In an alternative embodiment, two counters may be employed to determine the point in time at the center of a pulse. Preferably, a first counter counts continuously from the beginning of a scanning operation to the end of the scanning operation to keep track of absolute time with respect to the beginning of the scanning operation. Preferably, the second counter is employed solely to measure the duration of each pulse. By halving the value of the measurement indicated by the second counter for each pulse and adding this value to the value of the first counter recorded at the beginning of the pulse, a time measurement representing the chronological center of the pulse with respect to the beginning of the scanning operation may be determined.

For example, within a scanning operation comprising a plurality of pulses and associated image sampling operations, the case of a third pulse within the scanning operation is considered. The value of counter 1 at the beginning of the third pulse is represented by $C_1 3i$ and the value of time at the center of the third pulse is represented by $T_3$. The duration of the pulse as measured by counter 2 is represented by $C_2$. According to a preferred embodiment, an equation representing the calculation of the value of time at the center of the third pulse of a scanning operation is represented by: $T_3=C_1 3i+C_2/2$. Preferably, in the two-counter embodiment, the rate at which the first counter counts is substantially proportional to the velocity of the scanning apparatus with respect to the object being scanned. In other alternative embodiments, any number of counters may be used, and all such embodiments are within the scope of the present invention.

In a preferred embodiment of the present invention, time line 405 contains the interrupt 409 which indicates when the center of the pulse occurs. The chronological center of the LED pulse preferably occurs at a point extremely close in time to the geometric center of the travel of the LED and sensor along the scanned surface during the time period of the sampling operation since the scanning apparatus moves at substantially constant velocity during said sampling operation. It is noted that based on conditions determined at the time of the scanning operation, the length of the pulse may be varied from one operation to another. Pulses of any duration are intended to be within the scope of the present invention.

In an alternative embodiment, the processor may be informed of the geometric center of a sampling operation by means other than those described above, including but not limited to: light intensity sensors which indicate when peak illumination occurs, a position sensor which detects sensor proximity to a desired sampling point, a counter which measures the duration of the entire pulse and transmits this information to the processor enabling the processor to determine when the mid-point of the pulse occurred, and a distance measurement device which turns on and off with the LED thereby measuring the total travel of the sensor during the sampling operation which transmits this total travel information to the processor thereby enabling the processor to calculate the geometric center of the sampling operation.

In a preferred embodiment, the navigation processor, or other processor, has knowledge of the location of the discrete known positions or navigation markers A through F depicted in time line 401. The navigation processor is also able to accurately keep track of time between the various navigation markers. Therefore, when the interrupt 409 is received indicating that the center of the pulse has been reached, the navigation processor knows where the sensor is with respect to the previous and subsequent navigation markers and employs interpolation, either linear or non-linear, to calculate a precise location along the sensor scanning direction which corresponds to the location of the pulse.

Preferably, this adjusted location information, which is different from the location at which the "request sample" instruction was issued, is then appropriately associated with the image data acquired for that location and stored in memory, thereby correcting the positional information which would have been present had the "request sample" position datum been used.

In a preferred embodiment, the interpolation calculation is implemented as described herein. In the equation which follows, X(c) represents the geometric center of travel of a sensor within an area illuminated by a visible light pulse. The point in time at which the sensor reaches an initial navigation marker is denoted T(M1). The point in time at which the sensor reaches a succeeding navigation marker is T(M2). The point in time at which the sensor reaches the center of travel of the area illuminated by the light pulse is denoted T(c). The location of the initial and succeeding navigation markers are denoted X(M1) and X(M2) respectively. An equation for determining the geometric center, X(c), of the area illuminated by the light pulse is:

$$X(c)=X(M1)+[\{T(c)-T(M1)\}/\{T(M2)-T(M1)\}]*[X(M2)-X(M1)].$$

FIG. 5 depicts a sequence of steps 500 in which error due to a finite time lag is compensated for by employing position interpolation according to a preferred embodiment of the present invention. FIG. 5 depicts a sequence of steps similar to that shown in FIG. 4 with the addition of time lag 501 displayed on the request sample time line 401. The time lag 501 represents the lapse of time between the request sample instruction 407 and the center of LED pulse 407 resulting from such request as preferably reported by counters associated with the LED pulse mechanism. Preferably, the interpolation discussed in connection with FIG. 4 acts to correct the positional data associated with an image sample by the time lag 501 multiplied by the velocity of the scanning apparatus with respect to the object being scanned. Either linear or non-linear interpolation may be employed for purposes of correcting the positional data associated with the image sample.

In an alternative embodiment of the present invention, the time lag 501 can be calculated with greater precision by including velocity as a variable in the interpolation calculation of the position of the actual sample 502 or center of the LED pulse. Rather than assuming a constant relative velocity between the sensor and the object being scanned, the relative velocity can be calculated based upon time elapsed between navigation markers 406 (FIG. 4). Thereafter, when a counter associated with the LED pulse reports the center of said pulse, the navigation processor, or other suitable processing device, calculates the actual position of the sample by using the current speed of the scanning mechanism, the point in time of the interrupt representing the center of the LED pulse, and the processor's knowledge of the location of the preceding and succeeding navigation markers.

FIG. 6 depicts a sequence of steps 600 wherein predictive sampling is employed to enable sampling to occur at a desired position according to a preferred embodiment of the present invention.

The interpolation calculations discussed in connection with FIGS. 4 and 5 are directed to correcting positional data associated with image data after the act of emitting an LED pulse and measuring the reflected energy. However, with knowledge of the scanner velocity and of the lag time 501 (FIG. 5), it becomes possible to determine how far in advance of a desired position for a sampling operation to issue a request for an LED pulse. Thus, the sample can be conducted in precisely the right place to begin with, rather than calculating a positional error or offset after execution of the sampling operation.

In a preferred embodiment of the present invention, the navigation processor knows of a desired sample location 604 as depicted along time line 601 and calculates a predicted point in time 603 at which a request for sample data should be issued in order that the geometric center 605 of the resulting LED pulse 407 coincide precisely with the location of the desired sample 604. In a preferred sequence of events, the prediction point 603 is calculated by the navigation processor, and a request for sample initiated at that predictive point in time 603 as shown along time line 602. The LED pulse 407, depicted on time line 403, preferably begins immediately after the request for sample is executed and has its center 605 coincide with the desired sample location 604. Issuing a predictive request for sample 603 preferably eliminates the need for any arithmetic correction of the positional data associated with the image data collected in response to said predictive sample after the collection of said image data.

Preferably, the point at which the predictive request for sample is issued is calculated employing the lag time 501 (FIG. 5) determined in prior sampling operations, the velocity of the scanning apparatus with respect to the object being scanned, and the location of the navigation markers (FIG. 4). Where it is desired that the center of a pulse coincide with the location of a navigation marker, the navigation processor subtracts the product of the known lag time 501 and the scanner velocity from the position of the navigation marker to determine the predictive request sample (geometric) point 603. In terms of distance, a formula for calculation of the prediction point may be expressed as:

Prediction point=Navigation marker point−(scanner velocity*lag time). When expressing the prediction point in terms of time, an appropriate formula is:

Prediction point (t)=navigation (point in time)−lag time.

In a preferred embodiment, issuing a request for sample at a prediction point calculated as described above eliminates the need for any correction of positional data to be performed after the image data has been collected. Alternatively however, to ensure still further accuracy in the identification of the center of the LED pulse, the predictive and post-sample corrective approaches may be combined. Specifically, the request for sample would be issued predictively at point 603 (FIG. 6), and the navigation processor would still check to see if the interrupt 409 (FIG. 4) representing the center of the LED pulse 407 coincides with the desired navigation marker. If there is any mismatch between the pulse signaling the center of the LED pulse and the desired location for the sample, the navigation processor can adjust the position data associated with the image sample accordingly.

FIG. 7 depicts a navigation system apparatus 700 according to a preferred embodiment of the present invention. In this embodiment, two branches of sensory equipment process information relating to the scanning operation and store their respective types of information in the memory 730. The memory may comprise RAM, hard drive, CD-ROM, DVD or other form of digital storage. The navigation position information is carried along a first branch 710, and the optical information is carried along a second branch 720.

In a first branch 710, LEDs 711 transmit light toward the surface being scanned which is then reflected toward the navigation sensor 712. The task of the navigation sensor is to keep track of distance traveled along the scanned surface rather than evaluate the optical characteristics of that surface. Data from the navigation sensor 712 is then transmitted to an analog to digital converter (ADC) 713 for digitization of the data. Digitized information is then transmitted from the ADC 713 to the navigation processor 714 for processing. The navigation processor 714 preferably has its own dedicated memory 715 for performing various operations and calculations which is preferably DRAM memory. The navigation processor then transmits position information associated with particular optical sampling operations to memory 730 where it is stored for later digital reconstruction of the scanned image. In an alternative embodiment, the navigation processor would store the image and positional data internally and therefore have no need for any form of external memory device.

Preferably, the navigation sensor 712 includes a sensor array which acquires samples from an image at fixed intervals. The navigation processor 714 then preferably proceeds to compare successive image samples taken at the fixed intervals to determine distances between the images and absolute position of the navigation sensor with respect to the image being scanned. In an alternative embodiment, roller or encoder systems could be employed to measure travel of the navigation sensor 712 along the image.

In a preferred embodiment, the navigation processor 714 operates as the overall controller and task master for the steps of resetting the sensor(s), enabling the sensor(s) to begin collecting data, energizing the LEDs or other light source at appropriate times, and receiving pulses indicating the chronological center of illumination periods of the LEDs. These functions could also be performed by a number of intelligent devices including but not limited to programmable logic controllers and personal computers, and all such embodiments are intended to be within the scope of the present invention.

In a preferred embodiment, resetting the optical sensor 722 is made possible by virtue of the reset function 725. A dedicated physical connection may be implemented between the state machine 724 and the optical sensor 722 to enable operation of the reset function 725.

In a preferred embodiment, a second branch of information acquisition and transmission equipment 720 comprises LEDs 711 which transmit light toward the surface to be scanned which is then reflected towards the lens or other optical device 721 and on to an optical sensor 722. The optical sensor preferably converts optical energy into a form more readily digitized for computer manipulation of the resulting data. The optical information is preferably converted into a voltage proportional to the intensity of the measured light energy. Sensors available for this purpose include, but are not limited to charge coupled devices (CCDs) and contact image sensors (CIS). After conversion of the optical information into voltage, the ADC 723 converts the voltage into digital data and transmits this information in turn to the dedicated state machine 724.

In an alternative embodiment, light energy from the object being scanned may be converted into quantities other than voltage for subsequent digitization, including but not limited to: a modified light energy source, magnetic waves, thermal energy, and pressure.

Preferably, the dedicated state machine 724 performs signal processing operations on the optical data, including: smoothing out images by moderating sharp differences in values between adjacent pixels, compensating for irregularities in the sensor and LEDs and for sensor drift, and storing the resulting data in memory 730 where each package of optical data is tagged, or uniquely associated with, position information determined in branch 710.

FIG. 8 depicts a preferred embodiment navigation system placed over a surface to be scanned. Geometric line 801 represents a geometric line along the image to be scanned.

In a preferred embodiment, sensor apparatus 720 moves along geometric line 801 performing initiating sensing commands where needed. Sensor apparatus 720 determines that initiating a pulse of LED 711 when above point predictive point 803 along geometric line 801 will cause the center of the LED pulse 805 to occur at an optimum point. Specifically, it is desired that the center of the LED pulse 805 coincide with the desired sampling point 804. The inventive mechanism can thereby ensure a high degree of positional accuracy of data associated with the image sampling data taken above point 804.

In a preferred embodiment, in order to ensure accuracy of the image data itself, the dedicated state machine 724 acts to reset the optical sensor 722 with the reset function 725 prior to directing the LED 711 to energize. The dedicated state machine 724 can thereby ensure that dark current is substantially eliminated from the resulting image data measurements processed by optical sensor 722. Resetting optical sensor 722 may be accomplished either by continuously holding sensor 722 in a state of reset prior to initiating the sampling operation depicted, or by issuing a brief pulse reset immediately prior to initiating said sampling operation. Element 802 depicts the length along geometric line 801 which is illuminated by LED 711 during the depicted sampling operation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for acquiring accurate data in a scanning operation comprising:
    at least one optical sensor for measuring light from an object to be scanned, thereby establishing a measurement level in said at least one sensor in response to said light;
    a reset switch for resetting said measurement level to zero prior to an optical sampling operation, thereby removing a sensor drift component in said measurement level in said at least one optical sensor prior to said optical sampling operation; and
    an interrupt signal for signaling said system when said sensor has reached a geometric center of each said optical sampling operation thereby enabling said system to associate accurate positional data with optical data collected in each said optical sampling operation.

2. The system of claim 1, wherein optical sampling operations are performed asynchronously.

3. The system of claim 1, wherein said reset switch acts to maintain said measurement level in said at least one sensor at zero at all times in between optical sampling operations.

4. The system of claim 1, wherein said reset switch acts to bring said measurement level in said at least one sensor to zero immediately prior to each optical sampling operation.

5. The system of claim 1, further comprising a light source for illuminating said object to be scanned.

6. The system of claim 1, wherein said optical sensor converts light intensity into voltage.

7. The system of claim 6, wherein said reset switch acts to switch said optical sensor output to ground prior to each optical sampling operation.

8. The system of claim 1, further comprising:
    a counter for generating said interrupt signal.

9. A method for accurately associating position data with optical data in a scanning operation, the method comprising the steps of:
    identifying a point along a direction of scanning travel at which collection of optical data is desired, wherein said point is an initial navigation marker;
    initiating optical data collection by at least one sensor at a point fixed with respect to said initial navigation marker;
    identifying a position corresponding to a center of travel of said at least one sensor with respect to an object being scanned during said optical data collection, wherein there is a lag time between said step of initiating optical data collection and a time at which said at least one sensor reaches said center of travel; and
    associating a position corresponding to said center of travel of said at least one sensor with optical data collected during said optical data collection.

10. The method of claim 9, wherein said optical data collection is initiated at said initial navigation marker.

11. The method of claim 10, comprising the further step of:
    generating a signal to indicate when said at least one sensor has reached said center of travel of said at least one sensor thereby establishing a point in time at which said center of travel is reached.

12. The method of claim 11, further comprising the step of:
    calculating the position of said center of travel of said at least one sensor, denoted by X(c), from knowledge of:
    a point in time at which said at least one sensor reaches said initial navigation marker which is denoted T(M1);
    a point in time at which said at least one sensor reaches an immediately succeeding navigation marker, which is denoted T(M2);
    the point in time at which said at least one sensor reaches said center of travel which is denoted T(c);
    a location of said first navigation marker which is denoted X(M1); and
    a location of said immediately succeeding navigation marker which is denoted X(M2), wherein such information is known to a processor in control of said scanning operation.

13. The method of claim 12, wherein the step of calculating comprises:
    effecting an interpolation computation, said computation comprising a following expression:

$$X(c)=X(M1)+[\{T(c)-T(M1)\}/\{T(M2)-T(M1)\}]*[X(M2)-X(M1)].$$

14. The method of claim 9, wherein said optical data collection is initiated at a point in time which precedes an arrival of said at least one sensor at said initial navigational marker by said lag time, thereby enabling said center of travel of said at least one sensor to coincide with said initial navigation marker.

15. A method for accurately locating an optical data sample in a scanning operation, the method comprising the steps of:
    identifying a geometric point along a direction of scanning travel at which an optical sampling operation is desired, wherein:
    identification of said geometric point uniquely identifies a point in time during said scanning operation, said point in time being a desired sampling time; and
    said geometric point is a desired sampling location;
    determining a lag time period between initiation of said optical sampling operation and a center point of said optical sampling operation; and
    initiating said optical sampling operation at a point in time one lag time period prior to said desired sampling time, thereby causing said desired sampling time and said center point of said optical sampling operation to coincide.

16. The method of claim 15, wherein:
    said optical sampling operation takes a period of time to complete, said period being a sampling period; and
    the lag time is equal to one half of the sampling period.

17. The method of claim 15, wherein a fixed quantity of light energy is associated with said sampling operation, and the center point of said optical sampling operation is a point wherein an amount of light energy sampled prior to said center point equals an amount of light energy sampled after said center point.

18. The method of claim 15, wherein the step of initiating said optical sampling operation comprises:

emitting light toward an object to be scanned wherein said light is reflected toward an optical sensor for said optical sampling operation.

19. The method of claim 15, wherein the step of initiating said optical sampling operation comprises:

enabling an optical sensor to receive light energy from an object being scanned.

20. The method of claim 15, comprising the further step of:

associating position data of said desired sampling location with optical data acquired during said optical sampling operation.

* * * * *

UNITED STATES PATENT AND TRADEMARK OFFICE
CERTIFICATE OF CORRECTION

PATENT NO.   : 6,259,084 B1  
DATED        : July 10, 2001  
INVENTOR(S)  : Richard L. Kochis et al.

It is certified that error appears in the above-identified patent and that said Letters Patent is hereby corrected as shown below:

<u>Column 1,</u>  
Line 4, before "TECHNICAL FIELD" insert
-- RELATED APPLICATIONS
Reference is made to the commonly assigned U.S. Patent Applications: Number 5,729,008 entitled "METHOD AND DEVICE FOR TRACKING RELATIVE MOVEMENT BY CORRELATING SIGNALS FROM AN ARRAY OF PHOTOELEMENTS"; Number 5,644,139 entitled "NAVIGATION TECHNIQUE FOR DETECTING MOVEMENT OF NAVIGATION SENSORS RELATIVE TO AN OBJECT"; Number 5,578,813 entitled "FREEHAND IMAGE SCANNING DEVICE WHICH COMPENSATES FOR NON-LINEAR MOVEMENT"; and Number 5,825,044 entitled "FREEHAND IMAGE SCANNING DEVICE WHICH COMPENSATES FOR NON-LINEAR COLOR MOVEMENT", the diclosures of which are hereby incorporated by reference. --

<u>Column 10,</u>  
Line 8, delete "$C_i4$" and insert therefor -- $C_f4$ --  
Line 12, delete "$T4=(C_i4+C_i4)/2$" and insert therefor -- $T4=(C_i4+C_f4/2$ --

Signed and Sealed this

Fifteenth Day of October, 2002

*Attest:*

*Attesting Officer*

JAMES E. ROGAN  
*Director of the United States Patent and Trademark Office*